(12) United States Patent
Winfield et al.

(10) Patent No.: US 6,285,445 B1
(45) Date of Patent: Sep. 4, 2001

(54) METHOD FOR DETERMINING AERODYNAMIC CHARACTERISTICS OF A GOLF BALL

(75) Inventors: Douglas Winfield, Mattapoisett; William Gobush, North Dartmouth, both of MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/398,367

(22) Filed: Sep. 17, 1999

(51) Int. Cl.$^7$ ................... G01P 3/36; G01N 3/56; A63B 57/00
(52) U.S. Cl. ................... 356/28; 73/9; 473/200; 473/222
(58) Field of Search ................... 473/199, 200, 473/222; 356/28; 73/9

(56) References Cited

U.S. PATENT DOCUMENTS

| | | |
|---|---|---|
| 3,513,707 | 5/1970 | Russell et al. . |
| 3,633,007 * | 1/1972 | Sanders . |
| 4,063,259 | 12/1977 | Lynch et al. . |
| 4,136,387 | 1/1979 | Sullivan et al. . |
| 4,137,556 | 1/1979 | Hass et al . |
| 4,158,853 | 6/1979 | Sullivan et al. . |
| 4,160,942 | 7/1979 | Lynch et al. . |
| 4,375,887 | 3/1983 | Lynch et al. . |
| 4,461,477 | 7/1984 | Stewart . |
| 4,477,079 | 10/1984 | White . |
| 4,695,888 | 9/1987 | Peterson . |
| 4,695,891 | 9/1987 | Peterson . |
| 4,713,686 | 12/1987 | Ozaki et al. . |
| 4,858,934 | 8/1989 | Ladick et al. . |
| 5,101,268 | 3/1992 | Ohba . |
| 5,111,410 | 5/1992 | Nakayama et al. . |
| 5,210,603 | 5/1993 | Sabin . |
| 5,297,796 | 3/1994 | Peterson . |
| 5,342,054 | 8/1994 | Chang et al. . |
| 5,471,383 | 11/1995 | Gobush et al. . |
| 5,501,463 | 3/1996 | Gobush et al. . |
| 5,575,719 | 11/1996 | Gobush et al. . |
| 5,589,628 | 12/1996 | Braly . |
| 5,682,230 | 10/1997 | Anfinsen et al. . |
| 5,846,139 * | 12/1998 | Bair et al. . |
| 6,186,002 | 2/2001 | Lieberman et al. . |

OTHER PUBLICATIONS

Science and Golf II, 1$^{st}$ Edition, Jul. 1994, Gobush et al., "Video Monitoring System to Measure Initial Launch Characteristics of Golf Ball," Ch. 50, pp. 327–333.
Science and Golf, 1$^{st}$ Edition, Jul., 1990, Chiraraishi et al., "A new method on measurement of trajectories of a golf ball" pp. 193–198.
Science and Golf, 1$^{st}$ Edition, S. Aoyama, Jul. 1990, "A modern method for the measurement of aerodynamic lift and drag on golf balls," pp. 199–204.
Scientific American, Jan. 1997, Mion et al., "Tackling Turbulence with Supercomputers," pp. 62–68.
The Wall Street Journal, Nov. 1997, Bill Richards, "Why It Takes a Rocket Scientist to design a Golf Ball," pp. B1 and B11.
Science and Golf II, Proceedings of the World Scientific of Congress of Golf, 1994, A. J. Cochran, pp. 348–354.

* cited by examiner

Primary Examiner—Stephen C. Buczinski
(74) Attorney, Agent, or Firm—Pennie & Edmonds LLP

(57) ABSTRACT

A method for determining the lift and drag coefficients of a golf ball includes launching the ball along a flight path, measuring the velocity at two positions along the flight path, using the measured velocities to determine the coefficients of lift and drag. The step of measuring the velocity includes taking two images of the ball at the two positions, where the time interval between images at each position is less than about 0.01 seconds.

23 Claims, 12 Drawing Sheets

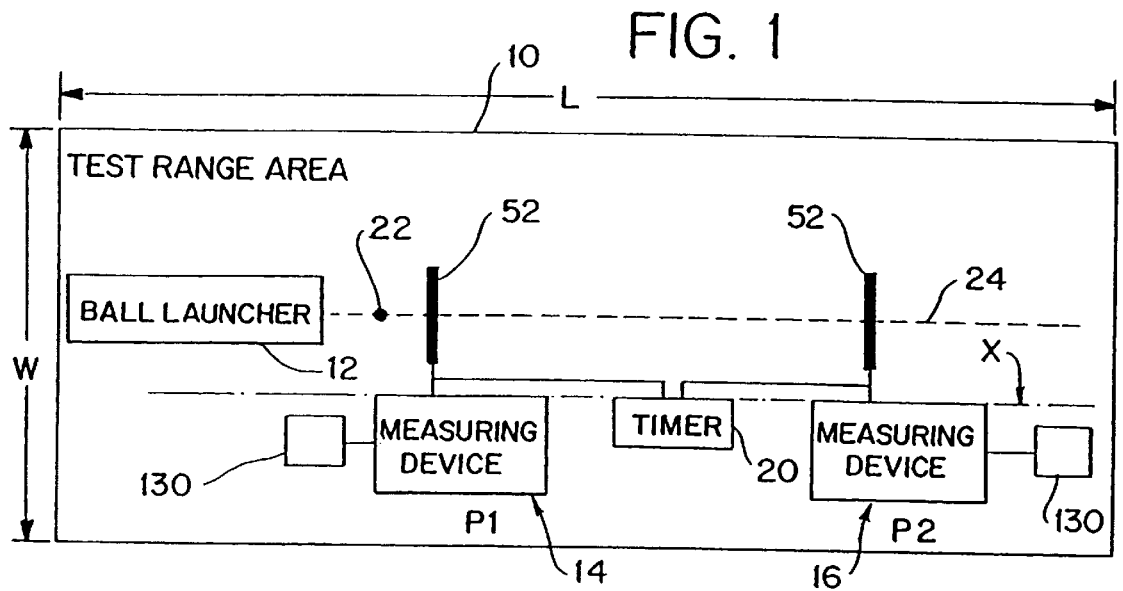
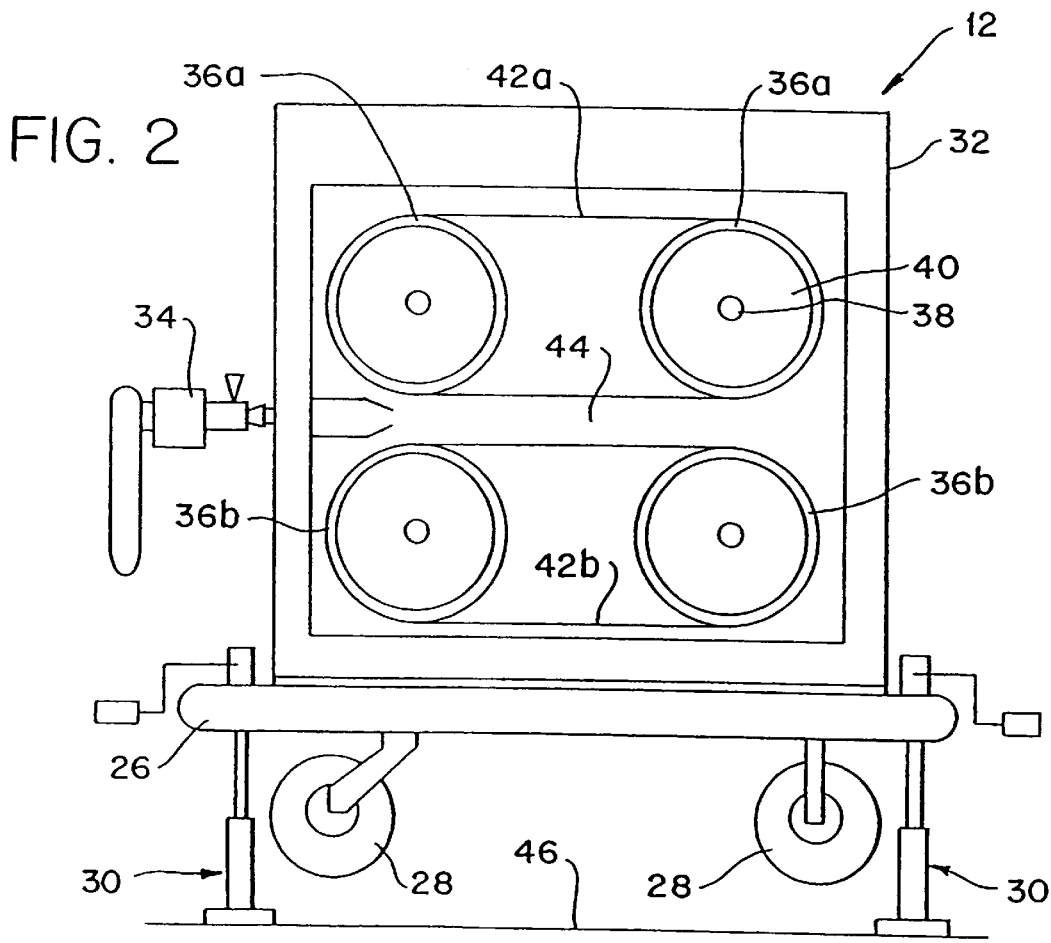

METHOD FOR DETERMINING AERODYNAMIC CHARACTERISTICS OF A GOLF BALL

TECHNICAL FIELD OF INVENTION

The present invention generally relates to a method and apparatus for measuring aerodynamic properties of objects, and more particularly of determining the drag and lift coefficients of golf balls in flight.

BACKGROUND OF THE INVENTION

Golf ball manufacturers generally are interested in determining a golf ball's trajectory, which predicts the ball flight distance. Typically, a golf ball's drag and lift coefficients are used to predict the trajectory of the golf ball. Manufacturers have used three techniques for determining a golf ball's drag and lift coefficients. Two conventional techniques use a wind tunnel and the remaining technique uses an indoor testing range.

The first technique uses a golf ball that is supported on a spindle within the wind tunnel. The spindle is affixed to the surface of the ball. The spindle freely rotates on low friction bearings. With the ball immersed in the wind stream, a motor coupled to the spindle spins the ball up to a predetermined spin rate and speed. The motor is disconnected from the spindle, and the ball continues to spin under the influence of its inertia and spin decay rate. The ball's lift and drag are monitored as the ball spins to a stop. The lift and drag are used to determine the trajectory.

This method is problematic for several reasons. First, there is a turbulence level present in the airstream of any wind tunnel, which is not present in the atmosphere through which a golf ball normally flies. Since a golf ball's aerodynamics are fundamentally turbulence driven, this can significantly affect the outcome of the test.

Second, in the wind tunnel the wind stream around the ball is disturbed at the point where the spindle is joined to the ball. This affects the measurements in a way for which it is difficult to compensate.

The second technique also uses the wind tunnel. A ball is spun up to speed outside the tunnel, then dropped into flowing air in the tunnel. The trajectory of the ball is then measured. The problems associated with using a wind tunnel, discussed above also occur using this method. In the second technique, the trajectory needs to be recorded in considerable detail, and the results are probably not highly accurate.

The third technique uses a series of ballistic light screens, where the screens alternate between being vertical or inclined. U.S. Pat. No. 5,682,230 to Anfinsen et al. discloses such an arrangement. When using this set-up, the ball is launched into flight and passes through the series of screens. The orientation of the screens allows the velocity and ball's coordinates to be measured. This information is used to determine the ball's trajectory.

This method is troublesome, because the test set-up requires determining the precise location of each light screen. Locating each light screen involves firing numerous balls. This is undesirable because it is time consuming.

It would therefore be desirable to provide an improved method for determining the drag and lift coordinates of a golf ball, while the ball is in actual flight.

SUMMARY OF THE INVENTION

Broadly, the present invention comprises method for determining the coefficients of lift and drag of a golf ball.

In one embodiment, the method of determining the lift coefficient and a drag coefficient for a golf ball along a flight path includes the steps of providing a launching device for launching the golf ball along the flight path, launching the golf ball along the flight path from the launching device, taking two images of the ball at a first position spaced from the launching device, taking two images of the ball at a second position, using the images at the first position to determine a first measured velocity at the first position, using the images at the second position to determine a second measured velocity at the second position, and calculating the drag coefficient and the lift coefficient using the first measured velocity and the second measured velocity. The method further includes a first and second time interval between taking the images at the first and second positions, respectively, where the time intervals are less than about 0.01 seconds.

In another embodiment of the method, the method includes providing a launching device for launching the golf ball along the flight path; launching the golf ball along the flight path from the launching device, measuring a first measured velocity at a first time and at a first position spaced from the launching device, measuring a second measured velocity at a second time and a second position spaced from the first position, estimating a lift coefficient and a drag coefficient, determining a first predicted velocity at the first position and the first time and determining a second predicted velocity at the second position and the second time, solving a Jacobian matrix to determine a Jacobian solution, calculating a first velocity difference between the first predicted velocity and the first measured velocity and calculating a second velocity difference between the second predicted velocity and the second measured velocity using the lift and drag coefficients, and calculating a new drag coefficient and a new lift coefficient using the Jacobian solution, the first velocity difference and the second velocity difference.

In yet another embodiment, measurements can be taken at more than two positions.

BRIEF DESCRIPTION OF THE DRAWINGS

FIG. 1 is a schematic plan view representing a system for measuring aerodynamic properties of a ball;

FIG. 2 is a side view of a golf ball launching device for use in the system of FIG. 1;

DETAILED DESCRIPTION OF THE PREFERRED EMBODIMENTS

FIG. 1 illustrates a schematic plan view of the system for testing of the present invention. The system includes an indoor testing area 10, which contains a ball launching device 12, two measuring devices 14 and 16 with monitors, and a timer 20.

Figure 3:
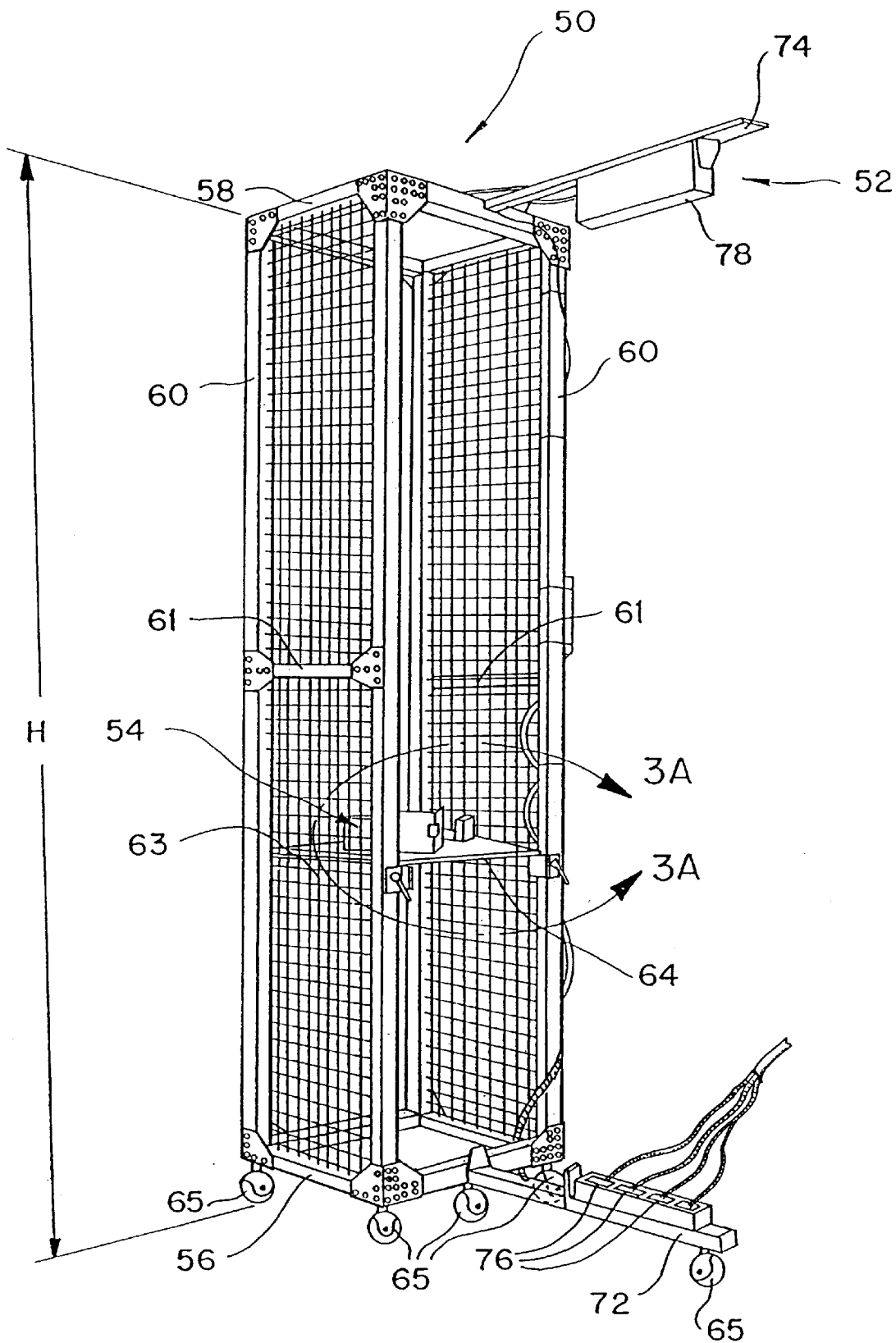
FIG. 3 is a perspective view of a measuring device for use in the system of FIG. 1.

The indoor testing area 10 is an indoor space that has a length L, a width W and a height H (as shown in FIG. 3). The length is preferably less than about 100 feet, and more preferably about 60 feet. The width is preferably less than 20 feet, and more preferably about 10 feet. The height is preferably less than 20 feet, and more preferably about 10 feet. This size of the testing area is exemplary and can be modified by one of ordinary skill in the art. This allows the system to be used in numerous existing commercial buildings. The testing area is optionally enclosed within conventional protective netting for safety reasons.

The ball launching device 12 is set-up at one end of the testing area 10. The launching device 12 is capable of independently controlling the initial velocity, spin rate, and direction of a golf ball 22 that it launches along a ball flight path 24 (shown in phantom). The preferred launching device is commercially available under the name the Ultra Ball Launcher, which is manufactured by Wilson® Sporting Goods Co. of Humboldt, Tenn. Other conventional launching devices can be used, such as a True Temper Test Machine, which strikes balls with a golf club.

Referring to FIG. 2, the preferred launching device 12 includes a base 26 supported by pneumatic tires 28, when the device is mobile. When the device is stationary, it is supported by leveling jacks 30. The leveling jacks 30 are telescoping members, which are manually adjustable to change the height of the base. The base 26 supports a vertically extending frame 32.

The frame 32 has an air cannon 34 mounted on one end for firing the ball at various speeds. The frame 32 further includes two wheel assemblies 36a and 36b. The first wheel assembly 36a is mounted at a first height and the second wheel assembly 36b is mounted at a second height below the first wheel assembly.

Each wheel assembly includes a pair of shafts 38 with a disk 40 rigidly attached thereto so that the disk 40 rotates relative to the frame 32. One motor (not shown) rotates one shaft in each assembly.

The device 12 further includes two belts 42a and 42b. One belt surrounds each pair of disks 40. The belts 42a and 42b define a ball launch path 44 there between and adjacent the air cannon 34.

During operation, after the air cannon 34 shoots the ball into the launch path 44, the belts 42a and 42b move at various belt speeds to impart the proper spin rate and velocity to ball. The average speed of the two belts determines the ball's speed. The difference in speed between the belts controls the ball's spin rate. The ball launch angle is determined by the angle between the ball launch path 44 and the ground 46. The launch angle is adjusted by changing the height of the front end of the vertical frame 32 relative to the base 26. The leveling jacks 30 can also be used to change the launch angle.

Referring to FIG. 1, the two measuring devices 14 and 16 determine the spin rate and velocity of the ball 22, and are located along side of the ball's flight path 24. The first measuring device 14 is located at a first position P1 downstream of the launching device 12, and the second measuring device 16 is located at a second position P2 spaced downstream of the first position P1.

Referring to FIGS. 1 and 3, each measuring device 14 and 16 includes a movable tower 50 that holds a ballistic light screen assembly 52 and monitor 54. The tower 50 is a box-like structure and includes a lower rectangular frame 56, an upper rectangular frame 58, and vertical columns 60 that join the frames 56 and 58 together at the corners. The tower also includes braces 61 for additional structural rigidity and wire mesh 63 at least on one side to protect the monitor 54 from flying balls. The frames 56 and 58, columns 60, and braces 61 are fastened together.

Figure 3A:
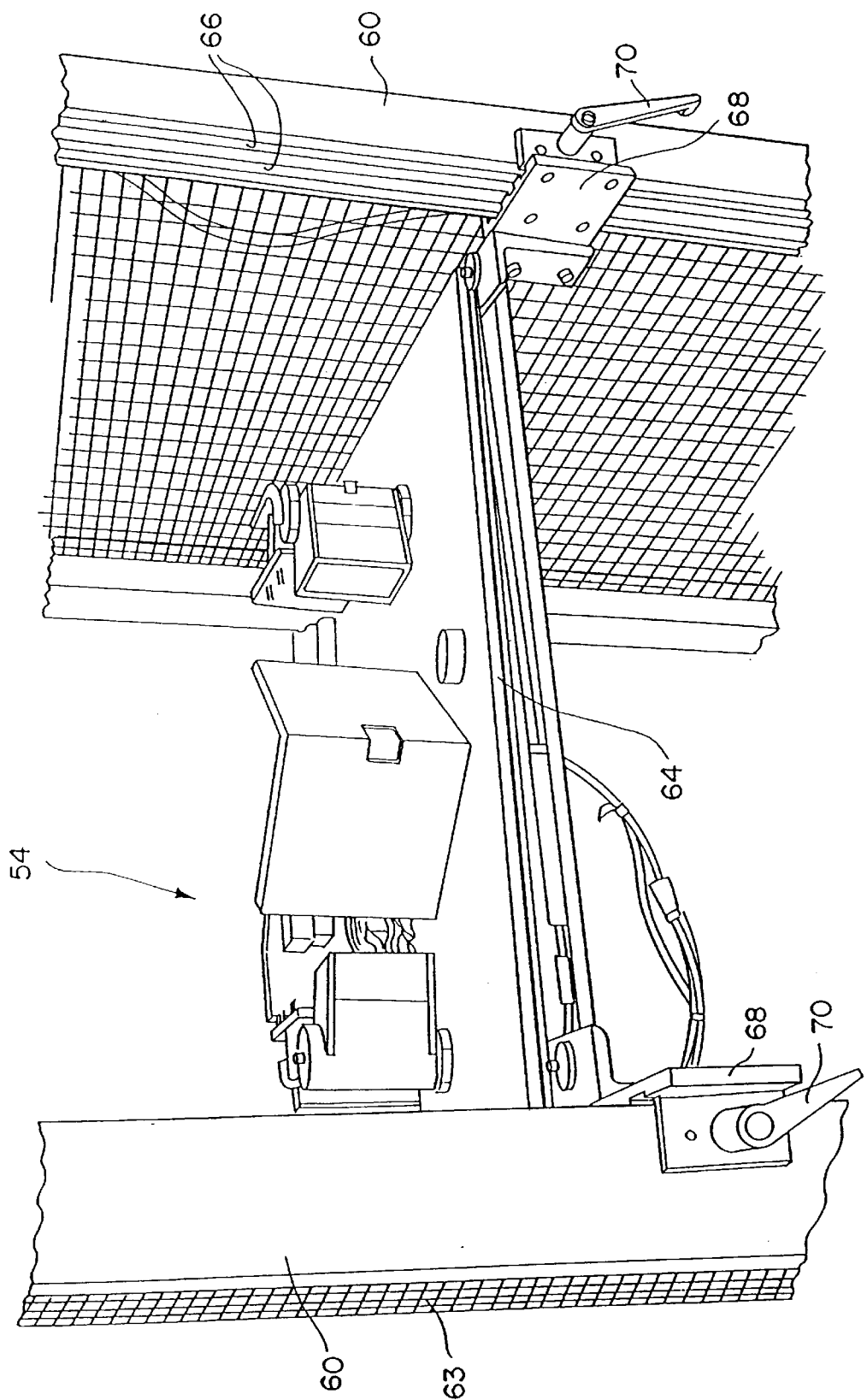
FIG. 3A is an enlarged view of a monitor shown within the circle 3A—3A of FIG. 3.

Referring to FIGS. 3 and 3A, the vertical columns 60 of the frame support a movable platform 64. Each column 60 defines grooves 66. A slider 68 is slideably attached to each column 60 through the grooves 66. The platform 64 is fastened to each of the sliders 68, and thus the platform 64 is vertically movable along the length of the columns 60. The platform is secured at various positions along the columns using clamps 70 connected to the sliders 68. Although, the movement of the platform 64 is manual in this embodiment, various conventional components can be used to automate the movement of the platform 64 along the columns, as known by those of ordinary skill in the art. The platform 64 supports the monitor 54 and allows its vertical position to vary and match the vertical height of the ball's flight path 24.

Referring to FIG. 3, the tower 50 further includes two support arms 72 and 74 for holding the components of the light screen assembly 52. The first support arm 72 extends horizontally outward from the lower frame 56 and is fastened thereto. The second support arm 74 extends horizontally outward from the upper frame 58 and is fastened thereto. Wheels 65 are connected to the lower frame 56 and the first support arm 72 so that the tower 50 is easily movable.

The light screen assembly 52 includes a plurality of connected sensors 76 and an elongated light bulb 78. The sensors 76 are mounted on the upper surface of the lower support arm 72 at spaced locations in a housing. The light bulb 78 is mounted on the lower surface of the upper support arm 74 so that light beams from the bulb 78 are directed downwardly in a screen toward the sensors 76. The light screen assembly is commercially available and one recommended light screen assembly is manufactured by Oehler Research under the name Model #55.

The light screen assembly 52 initiates and terminates various system functions, as discussed below. One such function is to act as a timer actuator for starting and stopping the timing device 20 (as shown in FIG. 1). The present invention is not limited to this type of actuation device. Other devices such as an audio trigger, a microphone, an acoustic screen, proximity sensors, or a series of laser beams can also be used.

Figure 4:
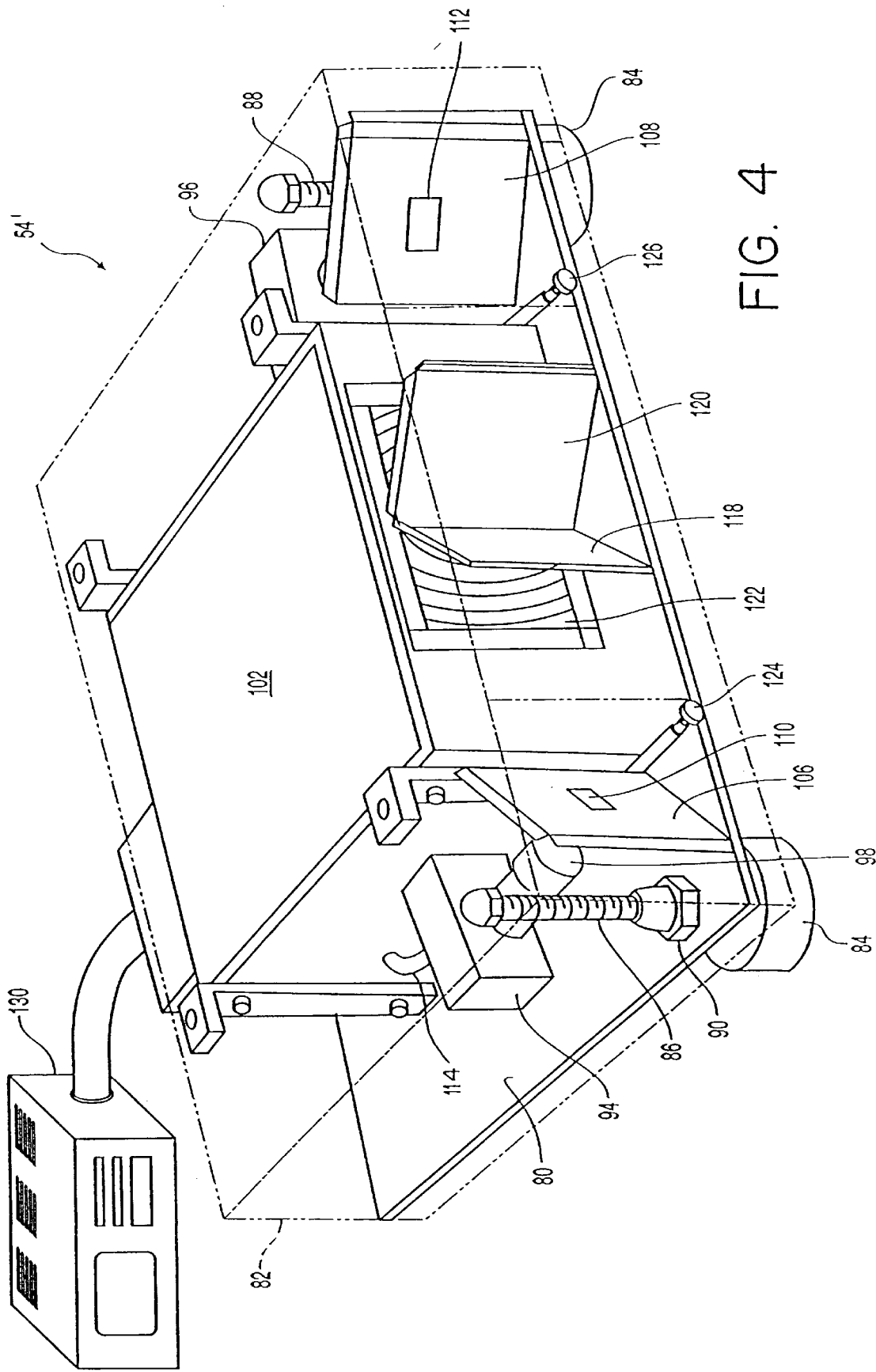
FIG. 4 is a perspective view of another embodiment of a monitor for use with the measuring device of FIG. 3.

Various monitors can be used as described in U.S. Pat. Nos. 5,471,383; 5,501,463; and 5,575,719 issued to Gobush et al. and expressly incorporated by reference herein in their entirety. Referring to FIG. 4, one embodiment of a monitor 54' is illustrated. The calibration, operation, detail of the components and use of the monitor are the subject of another commonly assigned application, U.S. patent application Ser.

No. 09/156,611, which is expressly incorporated herein in its entirety by reference thereto.

Figure 5:
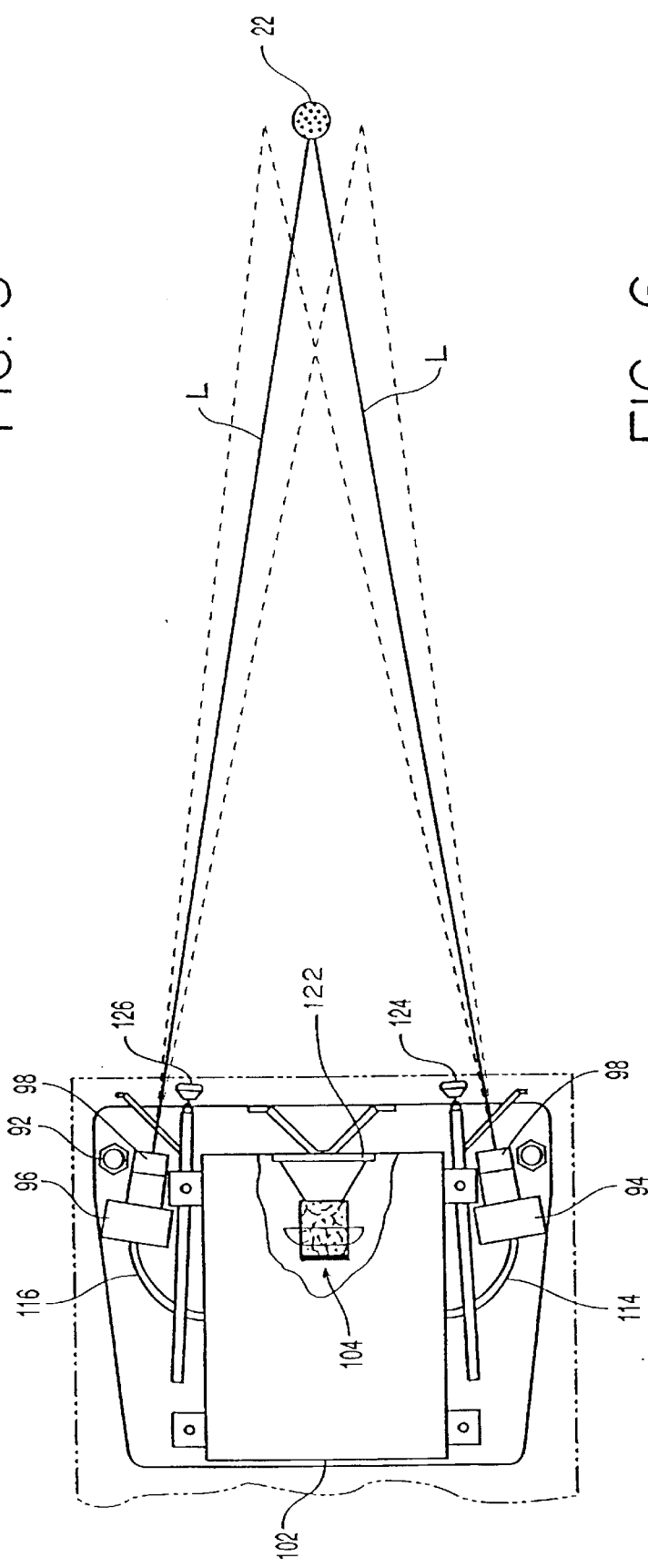
FIG. 5 is a top view of the monitor of FIG. 4.

Referring to FIGS. 4 and 5, the monitor 54' includes a base or support structure 80 that may also have a cover 82 (shown in phantom). Support elements or pads 84 are disposed below each corner of the support structure 80. The monitor 54' also includes threaded rods 86, 88 and respective nuts 90, 92 for allowing height adjustment at the front of monitor 54'. The rear of the base can also include rods and nuts so that the rear is also height adjustable.

Figure 7:
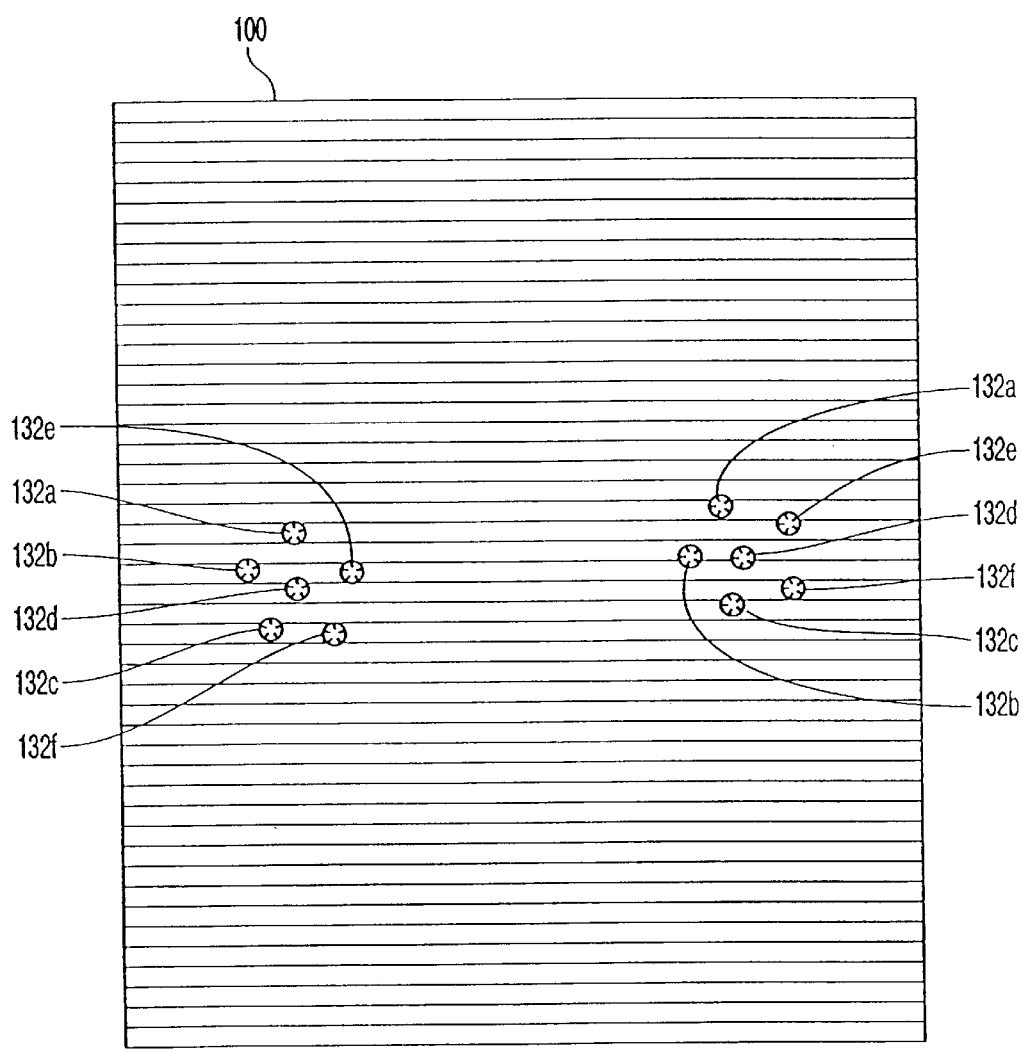
FIG. 7 is an elevational view of a light receiving and sensory grid panel located within the monitor of FIG. 4.

First and second camera units or electro-optical units 94, 96 are affixed to support structure 80. These camera units 94, 96 are preferably the ELECTRIM EDC-1000HR Computer Cameras available from the Electrim Corporation in Princeton, N.J. The cameras can be digital or film. In another embodiment, a single camera can be used; however, the results obtained will be less accurate than with two cameras. Each of the cameras 94, 96 has a lens 98, a light-receiving aperture, shutter, and light sensitive silicon panel 100 (see FIG. 7, showing a silicon panel, which also generally corresponds to an image captured by the cameras and used by the system).

The cameras 94, 96 each have a line-of-sight L, which are illustrated as solid lines in FIG. 5, that are directed to and focused on the predetermined field-of-view on the ball's flight path 24. As illustrated in FIG. 5 with the broken lines, the cameras' fields-of-view are larger than are necessary to image just a single golf ball 22. Thus, the predetermined field-of-view is the cameras' fields-of-view at the location where the cameras' lines-of-sight L intersect.

A control box 102 is provided and includes a strobe light unit at a front portion thereof. The strobe light unit has a single flash bulb assembly 104 capable of flashing faster than every 1000 microseconds. The unit also includes a cylindrical flash tube. The circuits used with the strobe light unit are the subject of another commonly assigned application (U.S. patent application Ser. No. 09/008,588), which is incorporated herein in its entirety by express reference thereto.

As best shown in FIG. 4, the reflective elements or panels 106, 108 are mounted to support structure 80. Panels 106, 108 may be plates formed of polished metal, such as stainless steel or chrome-plated metal. Other light reflective elements may also be used without departing from the spirit or scope of the invention. Each reflective panel 106, 108 defines respective apertures 110, 112.

Referring to FIGS. 4 and 5, cameras 94, 96 are mounted such that the lenses 98 are directed through the respective apertures 110, 112 in the reflective panels 106, 108 to the predetermined field-of-view. Video lines 114, 116 from the respective cameras 94, 96 lead to control box 102 to feed the video signals into control box 102 for subsequent use.

Referring to FIGS. 4 and 5, a third light-reflecting panel 118 reflects about one-half of the light from the flash bulb assembly 104 into panel 106 while a fourth light-reflecting panel 120 reflects the other half of the light into light-reflecting panel 108.

To increase the amount of light directed to the reflective elements or panels 106, 108, 118, and 120, the system 54' preferably has an optical or Fresnel lens 122 inserted at the front of the control box 102, placed between the flash bulb assembly 104 and the third and fourth reflective elements or panels 118, 120 as shown in FIGS. 4 and 5.

A lens assembly is formed by the flash bulb assembly 104 and the Fresnel lens 122. The Fresnel lens 122 directs light from the flash bulb assembly 104 to the third and fourth reflective elements 118, 120. The Fresnel lens has a collimating effect on the light from a cylindrical flash tube. Thus, the Fresnel lens 122 controls the dispersion of light. This arrangement allows the monitor 54' to have a smaller flash bulb assembly 104 than without the lens 122 because the collimation of the light increases the flux of light directed toward the golf ball in the predetermined field-of-view. This increase in the flux allows the possibility of using other reflective materials to mark the ball (or none at all), as well as the use of the system in brighter lighting conditions, including full-sun daylight.

The locations of the strobe light, reflective elements and cameras allow the light directed from the strobe to enter the field-of-view and is reflected back from the ball to the camera lenses through the apertures, due to reflective dots on the ball.

Figure 6:
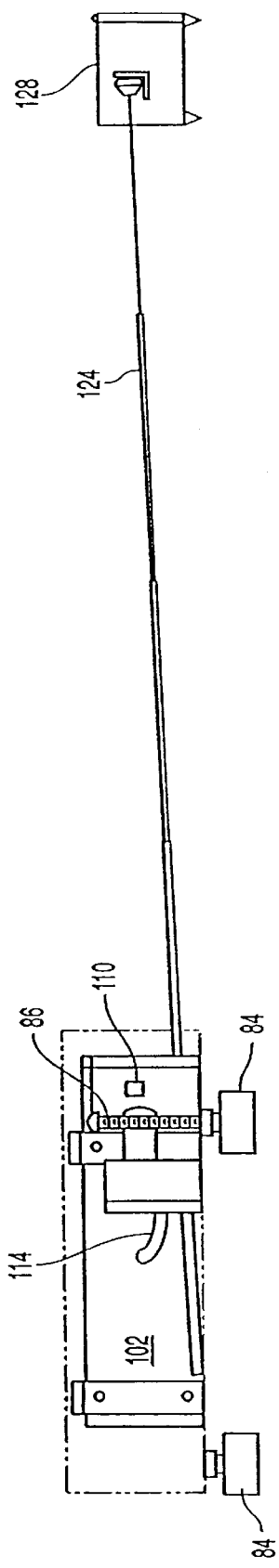
FIG. 6 is a side elevational view of the monitor of FIG. 4 during calibration.

Referring to FIGS. 4–6, telescoping distance calibrators or members 124, 126 are affixed to support structure 80. The telescoping members 124, 126 are used in calibrating the monitor 54' along the ball flight path 24 (as shown in FIG. 1) at the appropriate distance from the object to be monitored. Distance calibrators 124, 126 are extendable members, for example, conventional radio antennae can be used. Calibrators 124, 126 are used in conjunction with a calibration fixture 128. At least one distance calibrator should be used.

The system 54' also has a computer and monitor 130. The computer and monitor may be combined into a single element or may be separate elements. The computer has several algorithms and programs used by the system to make the determinations discussed below. As shown in FIG. 1, each computer 130 is connected to its associated measuring device 14 and 16 so that signals from the light screen assemblies 52 and monitors are communicated to the computer.

Referring to FIG. 1, the timer or timing device 20 measures a time interval. In this embodiment, the timer 20 is a personal computer equipped with a commercially available timer board. One recommended timer board is manufactured by Metrabyte under the name CTMS. The timer 20 is linked to the light screen assemblies 52. The invention is not limited to this type of timing device, for example other recommended devices are clocks and trigger devices, which are well known to those of skill in the art. In another embodiment, the timer can be incorporated into one of the computers connected to the monitor, so that a separate computer with a timer is not necessary.

Figure 8:
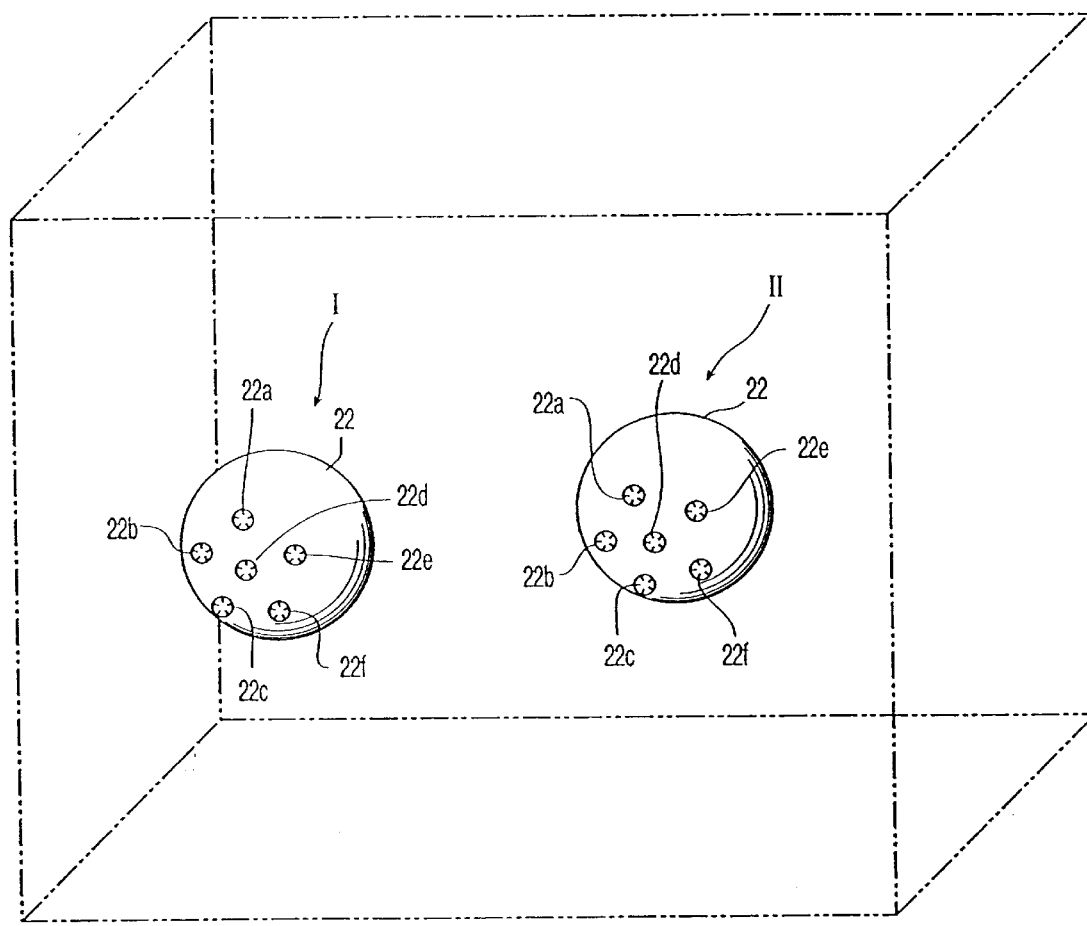
FIG. 8 is a perspective view of a three-dimensional rectilinear field-of-view showing the golf ball at two different angular orientations.

In FIGS. 1 and 8, a three-dimensional, predetermined, rectilinear field-of-view is shown in phantom. The golf ball 22 preferably has six (6) reflective, spaced-apart round areas or dots 22a–f placed thereon. Golf ball 22 is shown in two different angular orientations I and II to illustrate the preferred embodiment, corresponding to the locations of the golf ball 22 when imaged by each measuring device 14 and 16. In positions I and II, the golf ball 22 is shown after being launched from the ball launcher 12. The image taken at position I occurs at a first time and the image at in position II occurs at a second time. Both images are taken by measuring device 14 at the first position P1 or measuring device 16 at the second position P2 to determine the spin and velocity at positions P1 and P2. The number of dots or areas may be as few as three (3) and up to six (6) or more for the golf ball, provided each dot or area reflects light from the golf ball in both positions shown in FIG. 8.

Referring to FIGS. 4 and 8, as a result of the positioning of the cameras 94, 96 and the dots 22a–f, both cameras 94 and 96 are capable of receiving light reflected by dots 22a–f, which appear as bright areas 132a–f on the silicon panel 100 (as shown in FIG. 7) and the corresponding image. Alternatively, the dots may be non-reflective, appearing as dark areas 132a–f on the silicon panel. Instead of dots, the manufacturer's graphics, painted spots, corner-reflective retro-reflectors, or specially applied ink markings can be used.

Figure 9:
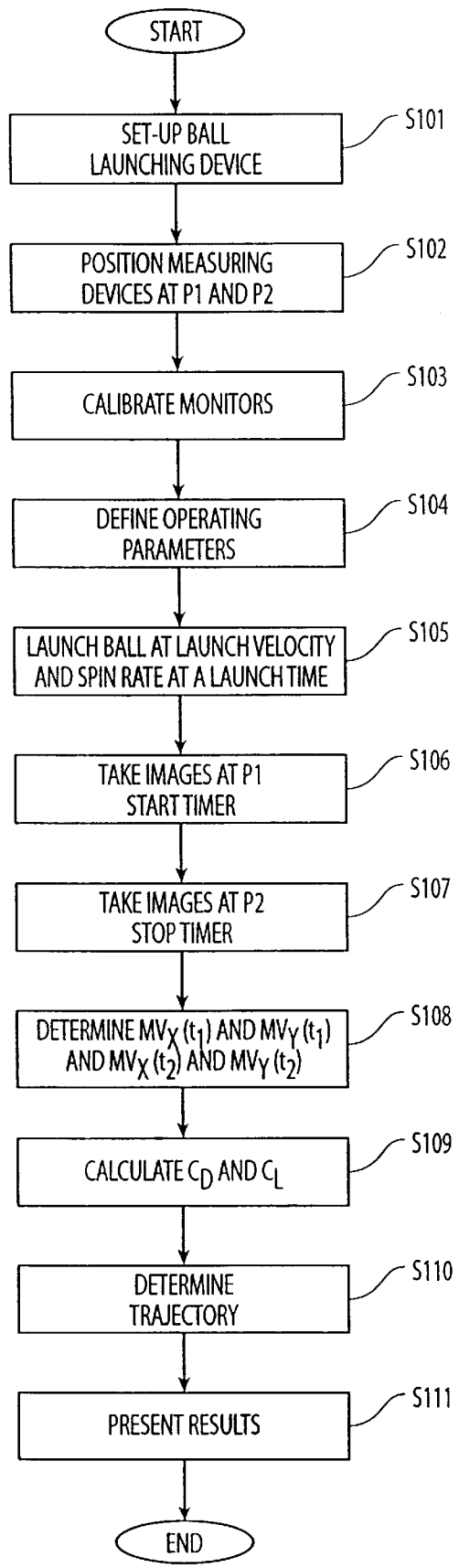
FIG. 9 is a flow chart describing the method of determining the aerodynamic properties.

Referring to FIGS. 1 and 9, the test procedure includes at step S101 setting up the ball launching device 12 at one end of the indoor testing area 10 and setting the initial velocity, spin rate, launch angle, and ball flight path 24 for the ball 22.

Turning to FIGS. 1, 4, and 9, at step S102, the measuring devices 14 and 16 are set-up at their respective positions P1 and P2, so that the cameras 94 and 96 are a predetermined distance from the ball flight path 24. This distance should allow the cameras to view and focus on the ball 22. A recommended distance is about 30 inches.

Referring to FIGS. 1, 3, and 9, the devices 14 and 16 should be aligned along a camera axis X that is parallel to the ball flight path 24. Various techniques can be used to align the cameras, for example a laser beam mounted on the first device 14 can be aimed parallel to the ball's flight path 24 at the proper distance. The second device 16 is then aligned with the beam. Next, the monitors are started and the computer determines if this is the first time the associated monitor has been used. By default, the monitors 54 will use the last calibration, when it is first activated. Therefore, at step S103, the monitors are calibrated each time each monitor is moved and/or turned on. Each monitor is calibrated to define the coordinate system to be used by the monitor using the telescoping members 124 and the fixture 128 (as shown in FIG. 6). Calibration of each monitors is detailed in U.S. patent application Ser. No. 09/156,611, referenced above.

After the monitors are calibrated, each monitor is set for either a test or a demonstration. If the test mode is selected, the system will save the test data. While in the demonstration mode, it will not save the data.

Referring only to FIG. 9, at step S104, additional data specific to the location of the test is entered. Specifically, the operator enters data for ambient conditions, such as temperature, humidity, barometric pressure, wind speed and direction, elevation, and type of turf to be used in making the calculations for the coefficients of lift and drag. After this data is entered, the monitor is ready for use.

At step S105, the launching device 12 launches the ball 22 into flight at predetermined launch conditions at a launch time, a launch spin rate, and a launch velocity.

Referring to FIGS. 3 and 9, at step S106, when the ball enters the first light screen 52 at position P1, the sensors 76 register a decrease in the light level from the bulb 78 and send a signal to the timer 20 for the timer to start. Simultaneously, a signal is sent to the computer 130 of the first monitor 54 at position P1 to take first images of the golf ball 22 at two times (as shown in FIG. 8) in the predetermined field-of-view. The time between taking the images is a first time interval that is less than about 0.01 seconds. More preferably the first time interval is about 800 microseconds. The images recorded by the silicon panel 100 (as shown in FIG. 7) are used by the monitor to determine the flight characteristics of the golf ball.

Referring again to FIGS. 3 and 9, after a short time interval, at step S107, when the ball passes through the light screen assembly 52 at the second position P2, the sensors 76 send a signal to the timer 20 for the timer to stop. Simultaneously, a signal is sent to the computer 130 of the second monitor 54 at position P2 to take two images of the ball at two times (as shown in FIG. 8) in the predetermined field-of-view. The time between taking the images is a second time interval that is less than about 0.01 seconds. More preferably the second time interval is about 800 microseconds. The images recorded by the silicon panel 100 (as shown in FIG. 7) are used by the monitor to determine the flight characteristics of the golf ball. These images are sent to the associated computer 130.

Referring to FIG. 9, at step S108, each monitor uses several algorithms stored in the computer to determine the angular orientation of the golf ball. After the computer has determined the orientation of the golf ball from the images, the monitors (and computer algorithms) determine the first measured velocity and the first spin rate at position P1 and time $t_1$.

The first measured velocity has x- and y-components of the velocity $MV_X(t_1)$ and $MV_Y(t_1)$. The monitors (and computer algorithms) also determine the second measured velocity and second spin rate at time $t_2$. The second measured velocity has x- and y-components of the velocity $MV_X(t_2)$ and $MV_Y(t_2)$. These determinations include locating the bright areas in the images, determining which of those bright areas correspond to the dots on the golf ball, and, then using this information to determine the orientation of the golf ball from the images. To find the spin rate the computer calculates the difference in angular orientation between the images.

Specifically, each monitor analyzes the images recorded by the cameras by locating the bright areas in the images. A bright area in the image corresponds to light from the flash bulb assembly 104 (as shown in FIG. 5) reflecting off of the retro-reflective dots or markers on the golf ball. Since the golf ball preferably has 6 dots on it, the system should find twelve bright areas that represent the dots in the images from each of the cameras (2 images of the golf ball with 6 dots). The system then determines which of those bright areas correspond to the golf ball's reflective dots. This can be done in several ways. If only twelve dots are found in the image, the system moves on to determine, from the dots in the images, the position and orientation of the golf ball during the first and second images. However, if there are more or less than twelve dots or bright areas found in the images, then the system allows the operator to manually change the images. If too few bright areas are located, the operator adjusts the image brightness, and if too many are present, the operator may delete any additional bright areas. In some instances, the bright areas in the images may be reflections off of other parts of the golf ball. If it is not possible to adequately adjust the brightness or eliminate those extraneous bright areas, then the system returns the operator to step S105 (as shown in FIG. 9), and the operator has the launching device launch another golf ball. If the manual editing of the areas is successful, however, then the system goes on.

The system uses the identification of the dots to determine the location of the centers of each of the twelve dots in each of the two images. Knowing the location of the center of each of the dots, the system can calculate the golf ball's spin rate, velocity, and direction.

Referring to FIG. 9, at step S109, the coefficients of lift and drag $C_L$ and $C_D$ are calculated using the measured velocities $MV_X(t_1)$, $MV_Y(t_1)$, $MV_X(t_2)$, $MV_Y(t_2)$ at the times $t_1$ and $t_2$, as discussed in detail below.

At step S110, the coefficients of lift $C_L$ and drag $C_D$ are used to determine the trajectory of the ball. To determine the trajectory, the drag lift forces $F_{Drag}$ and $F_{Lift}$ are first determined from the coefficients of lift and drag. The drag and lift forces are calculated using the following formulas:

$$F_{Drag} = \frac{C_D \rho A V^2}{2}$$

$$F_{Lift} = \frac{C_L \rho A V^2}{2}$$

where, $C_D$=the calculated coefficient of drag;
$C_L$=the calculated coefficient of lift;
$\rho$=the density of air;
v=the velocity of the ball; and
A=area of the ball=

$$\frac{\pi D^2}{4},$$

where D is the diameter of the ball.

The lift and drag forces are used to calculate the trajectory of the golf ball, as known by those of ordinary skill in the art. The trajectory is presented to the operator at step S111, in a numerical and/or graphical formats.

Figure 10:
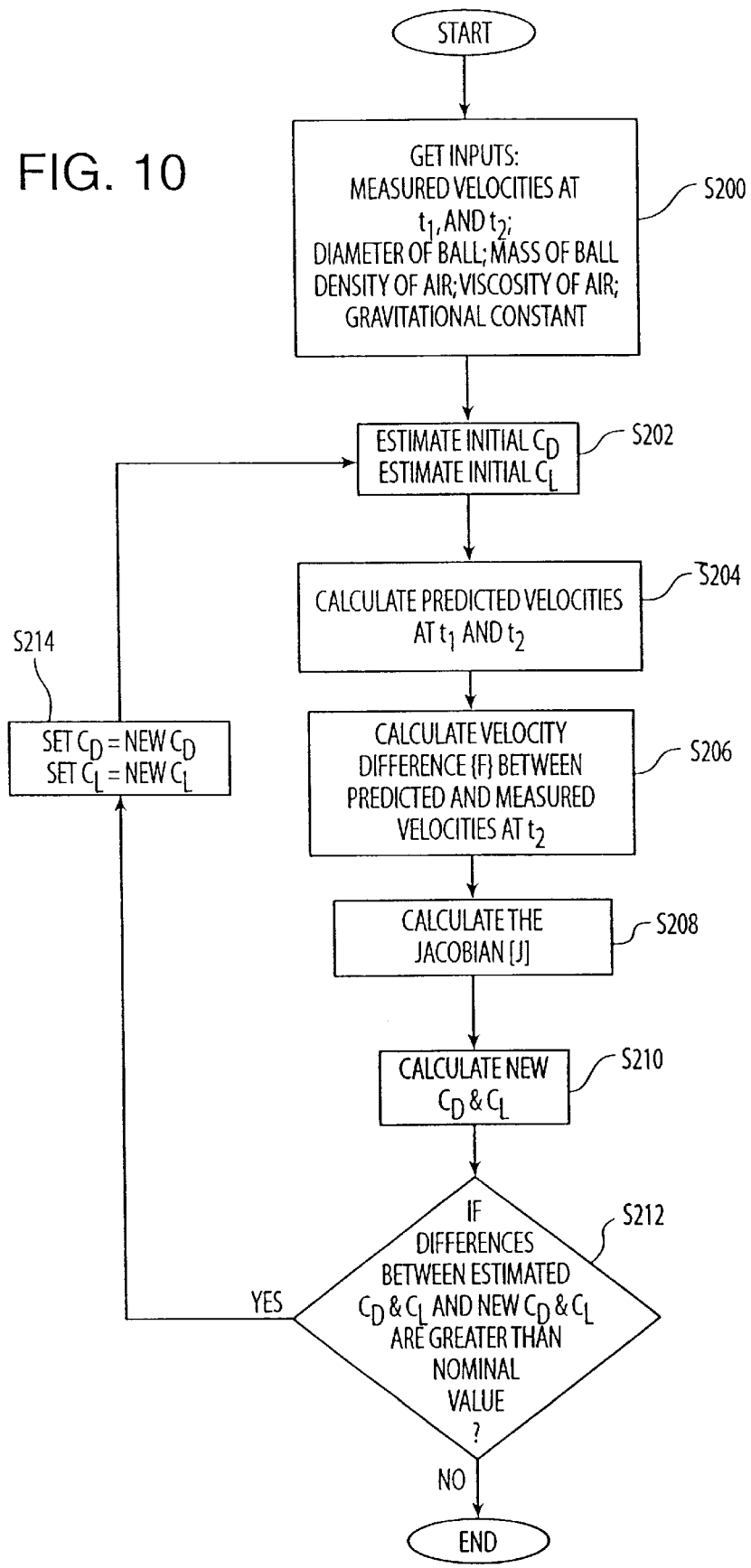
FIG. 10 is a flow chart describing the method of calculating the drag and lift coefficients for use with the method shown in FIG. 9.

Referring to FIG. 9, the step S109 of calculating the coefficients of lift and drag $C_L$ and $C_D$ will now be discussed in more detail. Referring to FIG. 10, at Step S200, the inputs necessary to make these calculations are retrieved. The inputs include the first measured velocity in the x-direction $MV_X(t_1)$ and the first measured velocity in the y-direction $MV_Y(t_1)$ at the first time $t_1$, the second measured velocity in the x-direction $MV_X(t_2)$ and the second measured velocity in the y-direction $MV_Y(t_2)$ at the second time $t_2$, the diameter of the golf ball D, the mass of the golf ball M, the density of the air $\rho$, the viscosity of the air v, and the gravitational constant g.

At step S202, initial estimates for the coefficients of $C_D$ and lift $C_L$ are made. At step S204, predicted values for the velocity components are calculated at the first and second times by using conventional numerical integration techniques on the following formulas:

$$\ddot{X}(t) = \frac{\rho A}{2M} \left\{ -C_D \frac{V_x(t)}{|V|} - C_L \frac{V_y(t)}{|V|} \right\} |V|^2$$

$$\ddot{Y}(t) = \frac{\rho A}{2M} \left\{ -C_D \frac{V_y(t)}{|V|} + C_L \frac{V_x(t)}{|V|} \right\} |V|^2 - g$$

where, $$|V| = \sqrt{[V_X(t)]^2 + [V_Y(t)]^2};$$

and t=time which is $t_1$ or $t_2$ where the measurements are made.
One preferred technique for numerical integration is the Runge-Kutta method. However, other methods can be used. The predicted velocity components found after numerically integrating the equations are $V_X(t_2)$, and $V_Y(t_2)$ whereas the initial conditions used during integration are the measured values at $t_1$ of $MV_X(t_1)$, $MV_Y(t_1)$.

At step S206, the velocity difference {F} between the predicted velocities $V_X(t_2)$, and $V_Y(t_2)$ and the measured velocities $MV_X(t_2)$, and $MV_Y(t_2)$, respectively, are calculated using the following equation:

$$\{F\} = \left\{ \begin{array}{c} \Delta V_X(t_2) \\ \Delta V_Y(t_2) \end{array} \right\}$$

where, $$\Delta V_X(t_2) = V_X(t_2) - MV_X(t_2);$$

and $$\Delta V_Y(t_2) = V_Y(t_2) - MV_Y(t_2).$$

At step S208, a Jacobian matrix or solution [J] is formed using the following formula:

$$[J] = \begin{bmatrix} \frac{\partial}{\partial C_D} \{\Delta V_X(t_2)\} & \frac{\partial}{\partial C_L} \{\Delta V_X(t_2)\} \\ \frac{\partial}{\partial C_D} \{\Delta V_Y(t_2)\} & \frac{\partial}{\partial C_L} \{\Delta V_Y(t_2)\} \end{bmatrix}$$

The derivatives in [J] are calculated numerically by perturbing the values of $C_D$ and $C_L$ by a small around and then calculating the change in the values of $\Delta V_X(t_2)$ and $\Delta V_Y(t_2)$ with respect to the change in $C_D$ and $C_L$.

At step S210, calculated or new values for the coefficients of drag and lift $C_D$ and $C_L$ are found solving the following equation:

$$\left\{ \begin{array}{c} C_D \\ C_L \end{array} \right\}^{new} = \left\{ \begin{array}{c} C_D \\ C_L \end{array} \right\}^{old} - [J]^{-1} \{F\}$$

The equation used in step S210 uses the old or estimated coefficients of drag and lift from step S202, the Jacobian solution [J], and the velocity difference {F}.

At step S212, the difference between the new value of the coefficient of drag $C_D$ and the estimated coefficient of drag $C_D$ as well as difference between the new coefficient of lift $C_L$ and the estimated coefficient of lift $C_L$ are calculated. If the difference is greater than to some nominal value, such as 0.0001, then the differences are significant and the yes branch is followed. Then, at step S214, the new values for the coefficients of lift and drag are used o continue the process where the calculated coefficients are recalculated using steps S204–S212. Once the difference at step S212 is insignificant or less than the nominal value, the no branch of the step S212 is followed, and the coefficients of lift and drag are now known.

Table I provides test data obtained according to the present invention. The results obtained below with golf balls are representative of the coefficient of lift and drag data that can be determined. In particular, the coefficients of lift and drag were obtained for several trials.

TABLE I

|  | Case 1 | Case 2 | Case 3 |
| --- | --- | --- | --- |
| Initial Velocity: (ft/sec) | 100 | 100 | 100 |
| Initial Spin: (revs/sec) | 42 | 42 | 42 |
| Initial Launch Angle: (deg) | 0 | 5 | −5 |
| Flight Time: (sec) | 0.75 | 0.75 | 0.75 |
| Calculated $C_D$ | 0.3072 | 0.3092 | 0.3053 |
| Calculated $C_L$ | 0.2825 | 0.2850 | 0.2801 |

Figure 11:
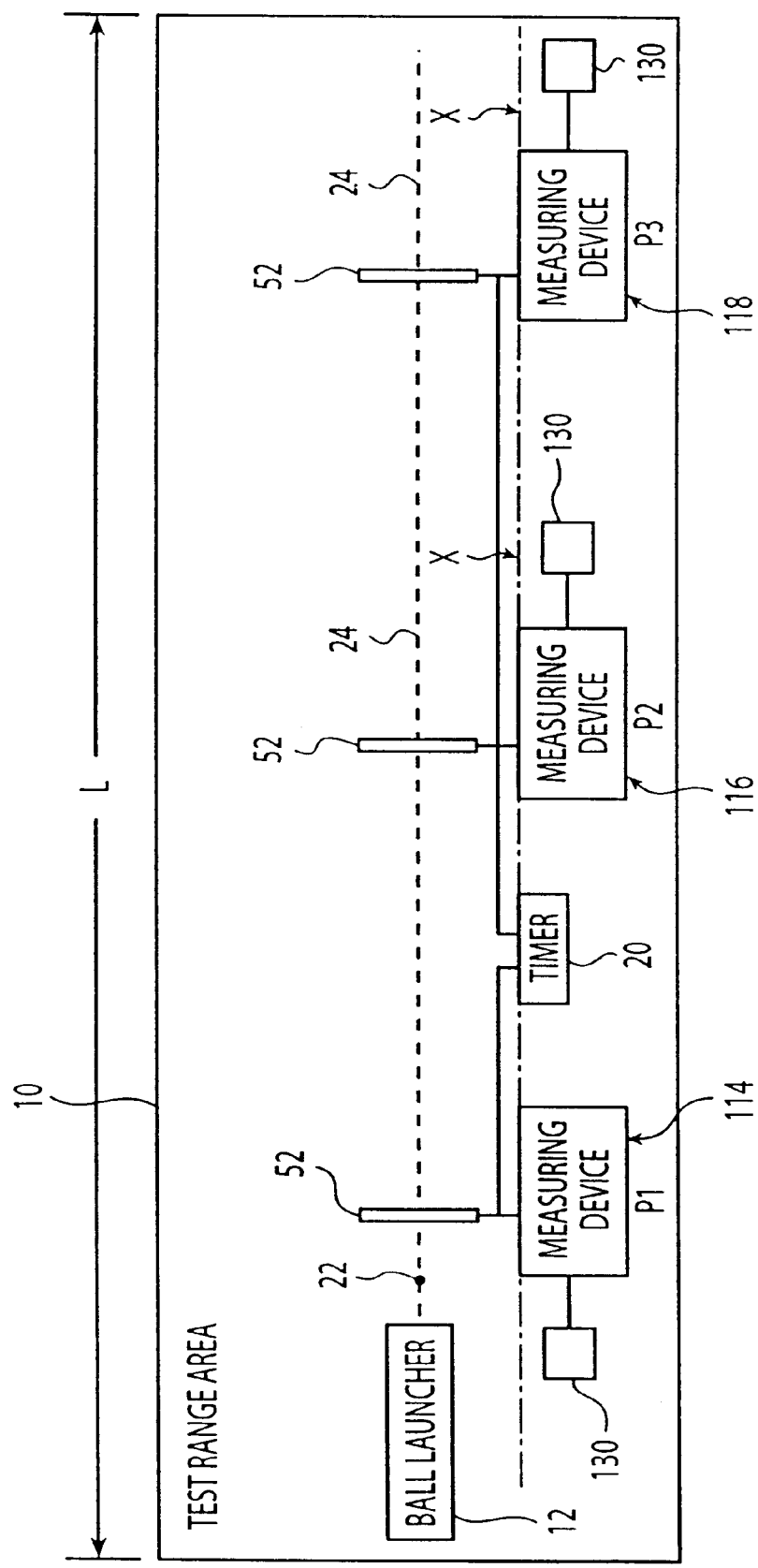
FIG. 11 is a schematic plan view representing another embodiment of a system for measuring aerodynamic properties of a ball.

As shown in FIG. 11, it is preferred to use three measuring devices 114, 116 and 118. Each measuring device is located at position P1, P2 or P3, respectively, and has the same configuration and operation, as discussed above. If more measuring devices are used, they would be at positions P4, P5, etc.

Figure 12:
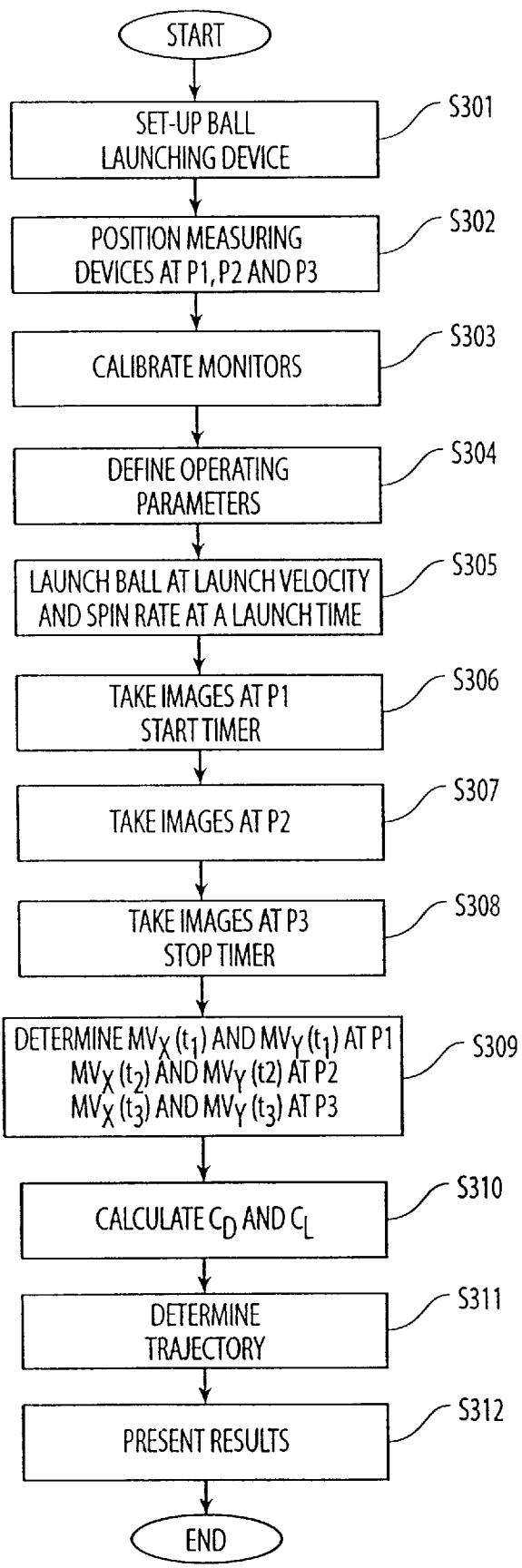
FIG. 12 is a flow chart describing an alternative method of determining the aerodynamic properties using the set up in FIG. 11.

Referring to FIGS. 11 and 12, the test procedure includes at step S301 setting up the ball launching device 12 at one end of the indoor testing area 10 and setting the initial velocity, spin rate, launch angle, and ball flight path 24 for the ball 22.

Turning to FIGS. 11, 4, and 12, at step S302, the measuring devices 114, 116, and 118 are set-up at their respective positions P1, P2, and P3 so that the cameras 94 and 96 are a predetermined distance from the ball flight path 24. This distance should allow the cameras to view and focus on the ball 22. A recommended distance is about 30 inches.

Referring to FIGS. 11, 3, and 12, the devices 114, 116 and 118 should be aligned along a camera axis X that is parallel to the ball flight path 24. Using various techniques discussed with the two monitor set up above.

Next, the monitors are started and the computer determines if this is the first time the associated monitor has been used. By default, the monitors 54 will use the last calibration, when it is first activated. Therefore, at step S303, the monitors are calibrated each time each monitor is moved and/or turned on. Each monitor is calibrated, as discussed above, to define the coordinate system to be used by the monitor using the telescoping members 124 and the fixture 128 (as shown in FIG. 6).

After the monitors are calibrated, each monitor is set for either a test or a demonstration. If the test mode is selected, the system will save the test data. While in the demonstration mode, it will not save the data.

Referring only to FIG. 11, at step S304, additional data specific to the location of the test is entered, as previously discussed. After this data is entered, the monitor is ready for use.

At step S105, the launching device 12 launches the ball 22 into flight at predetermined launch conditions at a launch time, a launch spin rate, and a launch velocity.

Referring to FIGS. 3 and 11, at step S306, two images are taken at position P1 and time $t_1$. At step S307, two images are taken at position P2 and time $t_2$. At step S308, two images are taken at position P3 and time $t_3$. These images are taken as discussed previously, and the images sent to the associated computer 130.

Referring to FIG. 11, at step S309, each monitor uses several algorithms stored in the computer to determine the angular orientation of the golf ball. After the computer has determined the orientation of the golf ball from the images, the monitors (and computer algorithms) determine the first measured velocity and the first spin rate at position P1 and time $t_1$.

The first measured velocity has x- and y-components of the velocity $MV_X(t_1)$ and $MV_Y(t_1)$. The monitors (and computer algorithms) also determine the second measured velocity and second spin rate at position P2 and time $t_2$. The second measured velocity MV2 has x- and y-components of the velocity $MV_X(t_2)$ and $MV_Y(t_2)$. The monitors (and computer algorithms) also determine the third measured velocity and third spin rate at position P3 and time $t_3$. The third measured velocity MV3 has x- and y-components of the velocity $MV_X(t_3)$ and $MV_Y(t_3)$.

Referring to FIG. 11, at step S310, the coefficients of lift and drag $C_L$ and $C_D$ are calculated using the velocities $MV_X(t_1)$, $MV_Y(t_1)$, $MV_X(t_2)$, $MV_Y(t_2)$, $MV_X(t_3)$ and $MV_Y(t_3)$ at the times $t_1$, $t_2$, and $t_3$ as discussed in detail below.

At step S311, the coefficients of lift $C_L$ and $C_D$ are used determine the trajectory of the ball. To determine the trajectory, the drag and lift forces $F_{Drag}$ and $F_{Lift}$ are first determined from the coefficients of lift and drag as previously discussed. The lift and drag forces are used to calculate the trajectory of the golf ball, as known by those of ordinary skill in the art. The trajectory is presented to the operator at step S312, in a numerical and/or graphical formats.

Figure 13:
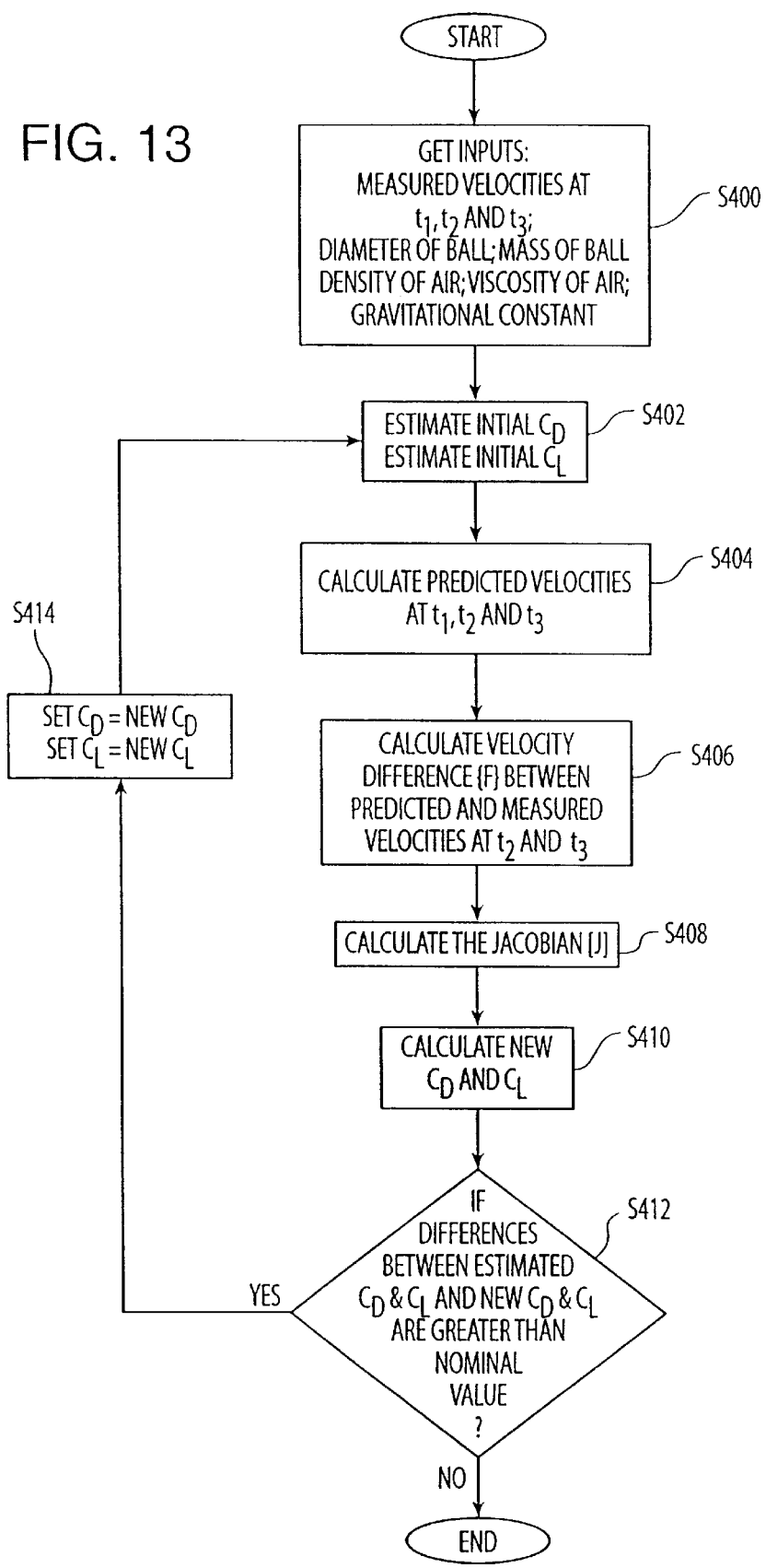
FIG. 13 is a flow chart describing the method of calculating the drag and lift coefficients for use with the method shown in FIG. 12.

Referring to FIG. 12, the step S310 of calculating the coefficients of lift and drag $C_L$ and $C_D$ will now be discussed in more detail. Referring to FIG. 13, at step S400, the inputs necessary to make these calculations are retrieved. The inputs include the first measured velocity in the x-direction $MV_X(t_1)$ and the first measured velocity in the y-direction $MV_Y(t_1)$ at the initial time $t_1$, the second measured velocity in the x-direction $MV_X(t_2)$ and the second measured velocity in the y-direction $MV_Y(t_2)$ at the second time $t_2$, the third measured velocity in the x-direction $MV_X(t_3)$ and the third measured velocity in the y-direction $MV_Y(t_3)$ at the third time $t_3$, the diameter of the golf ball D, the mass of the golf ball M, the density of the air $\rho$, the viscosity of the air $v$, and the gravitational constant g. It should be noted that more measurements can be made in order to calculate the coefficient of drag $C_D$ and lift $C_L$ At step S402, initial estimates for the coefficient of drag $C_D$ and lift $C_L$ are made. At step S404, predicted values for the velocity components are calculated at the first, second, and third times by using conventional numerical integration techniques on the following formulas:

$$\ddot{X}(t) = \frac{\rho A}{2M}\left\{-C_D \frac{V_X(t)}{|V|} - C_L \frac{V_Y(t)}{|V|}\right\}|V|^2$$

$$\ddot{Y}(t) = \frac{\rho A}{2M}\left\{-C_D \frac{V_Y(t)}{|V|} + C_L \frac{V_X(t)}{|V|}\right\}|V|^2 - g$$

where, $$|V| = \sqrt{[V_X(t)]^2 + [V_Y(t)]^2};$$

and t=time which can be $t_1$, $t_2$, and $t_3$ where the measurements are made.

The predicted velocity components found after numerically integrating the equations are $V_X(t_2)$, $V_Y(t_2)$, $V_X(t_3)$, $V_Y(t_3)$ whereas the initial conditions used are measured values at $t_1$ of $MV_X(t_1)$, $MV_Y(t_1)$.

At step S306, the velocity difference {F} between the predicted velocities $V_X(t_2)$, and $V_Y(t_2)$ and the measured velocities $MV_X(t_2)$, and $MV_Y(t_2)$ as well as those at $t_3$ are calculated using the formula:

$$\{F\} = \begin{Bmatrix} \Delta V_X(t_2) \\ \Delta V_Y(t_2) \\ \Delta V_X(t_3) \\ \Delta V_Y(t_3) \\ \vdots \end{Bmatrix}$$

where $$\Delta V_X(t_2) = V_X(t_2) - MV_X(t_2);$$

$$\Delta V_Y(t_2) = V_Y(t_2) - MV_Y(t_2);$$

$$\Delta V_X(t_3) = V_X(t_3) - MV_X(t_3);$$

and $$\Delta V_Y(t_3) = V_Y(t_3) - MV_Y(t_3).$$

It should be noted that the above equations can be extended to included more measurements at more than three positions.

At step S408, a Jacobian matrix or solution [J] is formed using the following formula:

$$[J] = \begin{bmatrix} \frac{\partial}{\partial C_D}\{\Delta V_X(t_2)\} & \frac{\partial}{\partial C_L}\{\Delta V_X(t_2)\} \\ \frac{\partial}{\partial C_D}\{\Delta V_Y(t_2)\} & \frac{\partial}{\partial C_L}\{\Delta V_Y(t_2)\} \\ \frac{\partial}{\partial C_D}\{\Delta V_X(t_3)\} & \frac{\partial}{\partial C_L}\{\Delta V_X(t_3)\} \\ \frac{\partial}{\partial C_D}\{\Delta V_Y(t_3)\} & \frac{\partial}{\partial C_L}\{\Delta V_Y(t_3)\} \\ \vdots & \vdots \end{bmatrix}$$

The derivatives in [J] are calculated numerically by perturbing the values $C_D$, $C_L$ by a small amount and then calculating the change in the values of $\Delta V_X(t_2)$, $\Delta V_Y(t_2)$, $\Delta V_X(t_3)$, and $\Delta V_Y(t_3)$ with respect to the change in $C_D$ and $C_L$ At step S410, calculated or new values for the coefficients of drag and lift $C_D$, $C_L$ are calculated solving the following equation:

$$\begin{Bmatrix} C_D \\ C_L \end{Bmatrix}^{new} = \begin{Bmatrix} C_D \\ C_L \end{Bmatrix}^{old} - \{[J]^T[J]\}^{-1}[J]^T\{F\}$$

At step S412, the difference between the new value of the coefficient of drag $C_D$ and the estimated or old coefficient of drag $C_D$ as well as difference between the new coefficient of lift $C_L$ and the estimated or old coefficient of lift $C_L$ are calculated. If the difference is greater than some nominal value, such as 0.0001, then the differences are significant and the yes branch is followed. Then, at step S414, the new values for the coefficients of lift and drag are used as the estimated coefficients to continue the process where the calculated coefficients are recalculated using steps S402–S412. Once the difference at step 412 is insignificant or less than the nominal value, the no branch of step S412 is followed, and the coefficients of lift and drag are now known.

While the above invention has been described with reference to certain preferred embodiments, it should be kept in mind that the scope of the present invention is not limited to these embodiments. Rather than strobe lights, a continuous light source can be used with a very fast camera shutter. Some high-speed electronic cameras require no special lighting. Conventional film cameras can also be used. Rather than one double exposure frame, sequential individual frames can be used. The pictures can be analyzed manually instead of automatically by the computer. The measuring device for measuring the spin rate should not limit the scope of the invention. Furthermore, more than three measuring devices can be used to do the measurements depending on the size of the test area and equipment available. One skilled in the art may find variations of these preferred embodiments which, nevertheless, fall within the spirit of the present invention, whose scope is defined by the claims set forth below.

We claim:

1. A method of determining a lift coefficient and a drag coefficient for a golf ball along a flight path, wherein the method comprises the steps of:
   a. providing a launching device for launching the golf ball along the flight path;
   b. launching the golf ball along the flight path from the launching device;
   c. taking two images of the ball at a first position spaced from the launching device, a first time interval between taking the images at the first position being less than 0.01 seconds;
   d. taking two images of the ball at a second position, a second time interval between taking the images at the second position being less than 0.01 seconds;
   e. using the images at the first position to determine a first measured velocity at the first position;
   f. using the images at the second position to determine a second measured velocity at the second position; and
   g. calculating the drag coefficient and the lift coefficient using the first measured velocity and the second measured velocity.

2. The method of claim 1, further including the first time interval and the second time interval being about 800 microseconds.

3. The method of claim 1, further including providing a first monitor for taking the two images at the first position and providing a second monitor for taking the two images at the second position.

4. The method of claim 1, further including taking two images of the ball at a third position, a third time interval between taking the images at the third position being less than 0.01 seconds; using the images at the third position to determine a third measured velocity at the third position; and calculating the drag coefficient and the lift coefficient using the first measured velocity, the second measured velocity, and the third measured velocity.

5. The method of claim 4, further including providing a third monitor for taking the two images at the third position.

6. The method of claim 4, further including taking two images of the ball at least one additional position downstream of the third position, an additional time interval between taking the images at the additional position being less than 0.01 seconds; using the images at the additional position to determine an additional measured velocity at the additional position; and calculating the drag coefficient and the lift coefficient using the measured velocities at each position.

7. The method of claim 6, further including providing an additional monitor for taking the two images at the additional position.

8. The method of claim 3, wherein the first and second monitors are aligned along a camera axis that is substantially paralled to the flight path of the golf ball.

9. A method of determining a lift coefficient and a drag coefficient for a golf ball along a flight path, wherein the method comprises the steps of:
   a. providing a launching device for launching the golf ball along the flight path;
   b. launching the golf ball along the flight path from the launching device;
   c. measuring a first measured velocity at a first time and at a first position spaced from the launching device;
   d. measuring a second measured velocity at a second time and a second position spaced from the first position;
   e. estimating a lift coefficient and a drag coefficient;
   f. determining a first predicted velocity at the first position and the first time and determining a second predicted velocity at the second position and the second time using the lift and drag coefficients;
   g. solving a Jacobian matrix including the lift coefficient, the drag coefficient, the first predicted velocity and the second predicted velocity to determine a Jacobian solution;

h. calculating a first velocity difference between the first predicted velocity and the first measured velocity and calculating a second velocity difference between the second predicted velocity and the second measured velocity; and i. calculating a new drag coefficient and a new lift coefficient using the Jacobian solution, the first velocity difference and the second velocity difference.

10. The method of claim 9, further including determining a lift coefficient and a drag coefficient for a golf ball along a flight path, further including calculating a drag difference between the drag coefficient and the new drag coefficient and calculating a lift difference between the lift coefficient and the new lift coefficient, and if the drag difference and the lift difference are greater than a nominal value the lift and drag coefficients are set to the new lift and drag coefficients, and the calculated lift and drag coefficients are recalculated until the drag difference and the lift difference are less than the nominal value.

11. The method of claim 9, wherein the step of determining the first predicted velocity and the second predicted velocity includes integrating the following formulas at the first time and the second time:

$$\ddot{X}(t) = \frac{\rho A}{2M}\left\{-C_D \frac{V_x(t)}{|V|} - C_L \frac{V_y(t)}{|V|}\right\}|V|^2$$

$$\ddot{Y}(t) = \frac{\rho A}{2M}\left\{-C_D \frac{V_y(t)}{|V|} + C_L \frac{V_x(t)}{|V|}\right\}|V|^2 - g$$

where, $\rho$ is a density of air;

M is a mass of the golf ball;

A is an area of the golf ball;

$V_x(t)$ is an x-component of the measured velocity of the golf ball at the associated time;

$V_y(t)$ is a y-component of the measured velocity of the golf ball at the associated time;

t is the first time and the second time;

$C_D$ is the drag coefficient;

$C_L$ is the lift coefficient;

g is a gravitational constant;

v is a viscosity of air; and $|V|=\sqrt{[V_x(t)]^2+[V_y(t)]^2}$.

12. The method of claim 11, wherein integrating the formulas further includes using a Runge-Kutta method.

13. The method of claim 9, wherein the Jacobian matrix [J] is defined as follows:

$$[J] = \begin{bmatrix} \frac{\partial}{\partial C_D}\{\Delta V_X(t_2)\} & \frac{\partial}{\partial C_L}\{\Delta V_X(t_2)\} \\ \frac{\partial}{\partial C_D}\{\Delta V_Y(t_2)\} & \frac{\partial}{\partial C_L}\{\Delta V_Y(t_2)\} \end{bmatrix}$$

where, $\Delta V_X(t_2)=V_X(t_2)-MV_X(t_2)$;

$\Delta V_Y(t_2)=V_Y(t_2)-MV_Y(t_2)$;

$V_X(t_2)$ is an x-component of the predicted velocity of the golf ball at the second time;

$MV_X(t_2)$ is an x-component of the measured velocity of the golf ball at the second time;

$V_Y(t_2)$ is a y-component of the predicted velocity of the golf ball at the second time;

$MV_Y(t_2)$ is a y-component of the measured velocity of the golf ball at the second time; $t_2$ is the second time;

$C_D$ is the drag coefficient; and $C_L$ is the lift coefficient.

14. The method of claim 13, further including calculating a difference {F} between the first predicted velocity and the first measured velocity and the difference between the second predicted velocity and the second measured velocity, the difference using the formula:

$$\{F\} = \begin{Bmatrix} \Delta V_X(t_2) \\ \Delta V_Y(t_2) \end{Bmatrix}.$$

15. The method of claim 14, wherein calculating the new drag and lift coefficients further including solving the following equation:

$$\begin{Bmatrix} C_D \\ C_L \end{Bmatrix}^{new} = \begin{Bmatrix} C_D \\ C_L \end{Bmatrix}^{old} - [J]^{-1}\{F\}.$$

16. The method of claim 10, further including using the coefficients of lift and drag to determine the lift force and the drag force on the ball.

17. The method of claim 16, further measuring a first spin rate at the first position, measuring a second spin rate at the second position, and using the first and second spin rates and the lift force and drag force to determine the trajectory of the ball.

18. A method of determining a lift coefficient and a drag coefficient for a golf ball along a flight path, wherein the method comprises the steps of:

a. providing a launching device for launching the golf ball along the flight path at an initial speed and initial spin rate;

b. launching the golf ball along the flight path at the initial speed and initial spin rate at an initial time from the launching device;

c. measuring a first measured velocity at a first time and at a first position spaced from the launching device;

d. measuring a second measured velocity at a second time and a second position spaced from the first position;

e. measuring at least one additional measured velocity at an additional time and an additional position spaced from the second position;

f. estimating a lift coefficient and a drag coefficient;

g. determining a first predicted velocity at the first position and the first time, determining a second predicted velocity at the second position and the second time, and determining additional predicted velocities at the additional positions and the additional times using the lift and drag coefficients;

h. solving a Jacobian matrix including the lift coefficient, the drag coefficient, the first predicted velocity and the second predicted velocity to determine a Jacobian solution;

i. calculating a first velocity difference between the first predicted velocity and the first measured velocity, calculating a second velocity difference between the second predicted velocity and the second measured velocity, and calculating additional velocity differences between the additional predicted velocities and the associated additional measured velocity; and j. calculating a new drag coefficient and a new lift coefficient using the Jacobian solution, the first velocity difference, the second velocity difference, and the additional velocity difference.

19. The method of claim 18, further including determining the lift coefficient and the drag coefficient for the golf ball along the flight path, further including calculating a drag difference between the drag coefficient and a new drag coefficient and calculating a lift difference between the lift coefficient and a new lift coefficient, and if the drag difference and the lift difference are greater than a nominal value the lift and drag coefficients are set to the new lift and drag coefficients, and the calculated lift and drag coefficients are recalculated until the drag difference and the lift difference are less than the nominal value.

20. The method of claim 18, wherein the step of determining the first, second and additional predicted velocities includes integrating the following formulas at the first time, second time and additional time:

$$\ddot{X}(t) = \frac{\rho A}{2M}\left\{-C_D\frac{V_x(t)}{|V|} - C_L\frac{V_Y(t)}{|V|}\right\}|V|^2$$

$$\ddot{Y}(t) = \frac{\rho A}{2M}\left\{-C_D\frac{V_Y(t)}{|V|} + C_L\frac{V_X(t)}{|V|}\right\}|V|^2 - g$$

where, $\rho$ is the density of air;

M is a mass of the golf ball;

A is an area of the golf ball;

$V_x$ is an x-component of the measured velocity of the golf ball;

$V_y$ is a y-component of the measured velocity of the golf ball;

t is the first time, the second time, and an additional time;

$C_D$ is the drag coefficient;

$C_L$ is the lift coefficient;

g is a gravitational constant;

v is a viscosity of air; and $|V|=\sqrt{[V_x(t)]^2+[V_Y(t)]^2}$.

21. The method of claim 18, wherein the Jacobian matrix [J] is defined as follows:

$$[J] = \begin{bmatrix} \frac{\partial}{\partial C_D}\{\Delta V_X(t_2)\} & \frac{\partial}{\partial C_L}\{\Delta V_X(t_2)\} \\ \frac{\partial}{\partial C_D}\{\Delta V_Y(t_2)\} & \frac{\partial}{\partial C_L}\{\Delta V_Y(t_2)\} \\ \frac{\partial}{\partial C_D}\{\Delta V_X(t_3)\} & \frac{\partial}{\partial C_L}\{\Delta V_X(t_3)\} \\ \frac{\partial}{\partial C_D}\{\Delta V_Y(t_3)\} & \frac{\partial}{\partial C_L}\{\Delta V_Y(t_3)\} \\ \vdots & \vdots \end{bmatrix}$$

where, $\Delta V_X(t_2) = V_X(t_2) - MV_X(t_2)$;

$\Delta V_Y(t_2) = V_Y(t_2) - MV_Y(t_2)$;

$\Delta V_X(t_3) = V_X(t_3) - MV_X(t_3)$;

$\Delta V_Y(t_3) = V_Y(t_3) - MV_Y(t_3)$;

$V_X(t_2)$ is an x-component of the predicted velocity of the golf ball at the second time;

$MV_X(t_2)$ is an x-component of the measured velocity of the golf ball at the second time;

$V_Y(t_2)$ is a y-component of the predicted velocity of the golf ball at the second time;

$MV_Y(t_2)$ is a y-component of the measured velocity of the golf ball at the second time;

$V_X(t_3)$ is an x-component of the predicated velocity of the golf ball at a third time;

$MV_X(t_3)$ is an x-component of the measured velocity of the golf ball at the third time;

$V_Y(t_3)$ is a y-component of the predicted velocity of the golf ball at the third time;

$MV_Y(t_3)$ is a y-component of the measured velocity of the golf ball at the third time;

$t_2$ is the second time;

$t_3$ is the third time;

$C_D$ is the drag coefficient; and $C_L$ is the lift coefficient.

22. The method of claim 21, further including calculating a difference $\{F\}$ between the first predicted velocity and the first measured velocity, the difference between the second predicted velocity and the second measured velocity, and the difference between the additional predicted velocity and the additional measured velocity the difference using the formula:

$$\{F\} = \begin{Bmatrix} \Delta V_X(t_2) \\ \Delta V_Y(t_2) \\ \Delta V_X(t_3) \\ \Delta V_Y(t_3) \\ \vdots \end{Bmatrix}.$$

23. The method of claim 22, wherein calculating the new drag and lift coefficients further including solving the following equation:

$$\begin{Bmatrix} C_D \\ C_L \end{Bmatrix}^{new} = \begin{Bmatrix} C_D \\ C_L \end{Bmatrix}^{old} - \{[J]^T[J]\}^{-1}[J]^T\{F\}.$$

* * * * *